United States Patent [19]

Amano et al.

[11] Patent Number: 5,496,580
[45] Date of Patent: Mar. 5, 1996

[54] METHOD FOR IMPROVING FLAVOR OF FOOD OR DRINK

[75] Inventors: Akira Amano; Kazuhiko Tokoro; Kenichi Uchiumi, all of Kanagawa, Japan

[73] Assignee: Takasago International Corporation, Tokyo, Japan

[21] Appl. No.: 346,194

[22] Filed: Nov. 22, 1994

[30] Foreign Application Priority Data

Nov. 24, 1993 [JP] Japan ................................. 5-315803

[51] Int. Cl.$^6$ ........................................................ A23L 2/56
[52] U.S. Cl. ............................................. 426/534; 426/533
[58] Field of Search ..................................... 426/534–538, 426/533

[56] References Cited

PUBLICATIONS

Furia et al, Fenaroli's Handbook of Flavor Ingedients, vol. 2, 1975, CRC Press: Cleveland, p. 355.
A. Monsandle, et al., *Deutsche Lebensmittel–Rundschau*, vol. 86, No. 12, pp. 375–379 (1990).

K. Rettinger et al., *Tetrahedron: Asymmetry*, vol. 2, No. 10, pp. 965–968 (Oct. 1991).

A. Monsandl, *Kontakte (Darmstadt)*, No. 3, pp. 38–48 (1992).

Primary Examiner—Carolyn Paden
Attorney, Agent, or Firm—Sughrue, Mion, Zinn, Macpeak & Seas

[57] ABSTRACT

A method for improving the flavor of a food or a drink which comprises adding (S)-(+)-2-methylbutyric acid and esters thereof having an optical purity of 70% e.e. or above at a ratio of from 1 to 150 ppm, in terms of the optical purity of 100%, based on the food or drink. The addition of the compounds as specified in the present invention makes it possible to improve the flavor and lifting up of the top note of a food or a drink.

3 Claims, No Drawings

METHOD FOR IMPROVING FLAVOR OF FOOD OR DRINK

FIELD OF THE INVENTION

This invention relates to a method for improving the flavor qualities and lifting up of the top note of a food or a drink which comprises adding (S)-(+)-2-methylbutyric acid and/or esters thereof to the food or drink.

BACKGROUND OF THE INVENTION

Many flavor-improving agents employed in, for example, food additives are in the form of racemic modifications and optically active compounds are scarcely used in food additives, etc.

It is known that 2-methylbutyric acid and its esters in the form of racemic modifications widely occur in natural substances, in particular, fruits. Among these racemic modifications, 2-methylbutyric acid and $C_1$ to $C_5$ alkyl esters thereof have been used as food flavors for imparting a fermented smell or a matured fruit note.

Although foods and drinks containing these flavors have a nice fermented smell or a feel of matured fruits to a certain extent, they are still unsatisfactory. In addition, these products leave much room for improvement in lifting up of the top note.

In recent studies, (S)-(+)-2-methylbutyric acid and its esters and (R)-(−)-2-methylbutyric acid (i.e., the optical antipode of the former compound) and its esters are analyzed by gas chromatography and the flavor of each compound has been reported [A. Monsandle et al., *Dtsch. Lebensm.—Rundsch.*, 86, no. 12, pp. 375–379 (1990), *Tetrahedron: Asymmetry*, 2, no. 10, pp. 965–968 (1991) and *Kontakte (Darmstadt)*, no. 3, pp. 38–48 (1992)], though these reports do not relate directly to the flavors of foods and drinks.

According to these reports, (S)-(+)-2-methylbutyric acid has a pleasant, sweet and fine fruit note while (R)-(−)-2-methylbutyric acid has a penetrating cheesy-sweaty note, and (S)-(+)-ethyl 2-methylbutyrate has an etheric, sweety, unspecific, pleasant apple note at extreme dilution while (R)-(−)-ethyl 2-methylbutyrate has a first medical-phenolic note and then a fruity-sweet but unspecific note.

However each of these reports merely evaluates the flavor of a single compound having no relation directly with the flavors of foods and drinks. Namely, none of them discloses the addition of (S)-(+)-2-methylbutyric acid or its esters to a food or a drink in practice followed by the evaluation of the flavor and lifting up of the top note of the food or drink.

SUMMARY OF THE INVENTION

The present inventors have studied on a specific flavor capable of improving the note and the lifting up of the top note, which has been regarded as being hardly improved, of a drink, namely, a flavor-improving agent for drinks and the flavor of a drink prepared with the use of the same. As a result, they have successfully found that when (S)-(+)-2-methylbutyric acid or its ester having an optical purity of 70% e.e. or above is added to a drink, then a note of a fresh feeling different from the fermented smell or matured fruit note of the racemic modification can be imparted to the drink and the lifting up of the top note of the obtained drink is much superior to the one achieved with the use of the racemic modification. That is to say, they have found out that the drink thus obtained has an excellent flavor and lifting up of the top note, namely, a green, fresh and light note, spreading lifting up of the top note and an enhanced flavor formulation. Based on these findings, the present inventors have further discussed the application of the above-mentioned method to foods, thus completing the present invention. Accordingly, it is an object of the present invention to provide a novel flavor-improving agent which imparts a fresh flavor and remarkable lifting up of the top note and a food or a drink having an improved flavor.

DETAILED DESCRIPTION OF THE INVENTION

Accordingly, the present invention provides the following matters.

(1) A method for improving the flavor of a food or a drink which comprises adding at least one compound selected from a group consisting of (S)-(+)-2-methylbutyric acid and esters thereof having an optical purity of 70% e.e. or above at a ratio of from 1 to 150 ppm, in terms of the optical purity of 100%, based on the food or drink.

(2) A method for improving the flavor of a food or a drink as set forth in the above (1), wherein (S)-(+)-2-methylbutyric acid having an optical purity of 80% e.e. or above is added.

(3) A method for improving the flavor of a food or a drink as set forth in the above (1), wherein (S)-(+)-methyl 2-methylbutyrate having an optical purity of 70% e.e. or above is added.

(4) A method for improving the flavor of a food or a drink as set forth in the above (1), wherein (S)-(+)-ethyl 2-methylbutyrate having an optical purity of 75% e.e. or above is added.

In the present invention, at least one compound selected from a group consisting of (S)-(+)-2-methylbutyric acid and esters thereof is used as an essential component. Examples of the (S)-(+)-2-methylbutyric acid esters include (S)-(+)-methyl 2-methylbutyrate, (S)-(+)-ethyl 2-methylbutyrate, (S)-(+)-propyl 2-methylbutyrate, (S)-(+)-butyl 2-methylbutyrate, (S)-(+)-2-methylpropyl 2-methylbutyrate, (S)-(+)-pentyl 2-methylbutyrate, (S)-(+)-2-methylbutyl 2-methylbutyrate, (S)-(+)-3-methylbutyl 2-methylbutyrate, (S)-(+)-hexyl 2-methylbutyrate, (S)-(+)-cis-3-hexenyl 2-methylbutyrate, (S)-(+)-heptyl 2-methylbutyrate, (S)-(+)-octyl 2-methylbutyrate, (S)-(+)-phenylmethyl 2-methylbutyrate, (S)-(+)-2-phenylethyl 2-methylbutyrate and (S)-(+)-3-phenyl-2-propyl 2-methylbutyrate. Among these compounds, (S)-(+)-2-methylbutyric acid and $C_1$ to $C_5$ alkyl (S)-(+)-2-methylbutyrates are the most preferable components to be used in the present invention.

The (S)-(+)-2-methylbutyric acid and esters thereof to be used in the present invention may be extracted from natural substances. Alternatively, those obtained by biochemical or chemical syntheses may be used therefor.

Biochemical synthesis may be performed in accordance with, for example, the method of K. H. Engel [*Tetrahedron: Asymmetry*, 2, no. 3, pp. 165–168 (1991)] by enantioselectively esterifying a racemic modification of 2-methylbutyric acid with the use of lipase to thereby give (S)-(+)-2-methylbutyrates.

In order to obtain the (S)-(+)-2-methylbutyric acid and its esters to be used in the present invention in a large amount, it is preferable to employ a chemical synthesis method. As an example of the chemical synthesis method, the one described in JP-A-63-239245 (corresponding to U.S. Pat.

No. 4,962,230) (the term "JP-A" as used herein means an "unexamined published Japanese patent application") may be cited. That is to say, tiglic acid [(E)-2-methyl-2-butenoic acid], which is easily obtained as a marketed product, employed as a starting compound is subjected to asymmetric hydrogenation with the use of a ruthenium-optically active phosphine complex having a specific absolute configuration. Thus (S)-(+)-2-methylbutyric acid, i.e., one of the target compounds, can be prepared. Then this product is reacted with an arbitrary alcohol by a publicly known method. Thus the target (S)-(+)-2-methylbutyrates can be obtained.

Now the method for producing (S)-(+)-2-methylbutyric acid will be described in greater detail. Tiglic acid is dissolved in a solvent such as methanol or ethanol. Then the resulting solution was fed into an autoclave replaced with an inert gas. Next, a ruthenium-optically active phosphine complex is added thereto in an amount of from 1/100 to 1/1000 times by mole as much as the tiglic acid and hydrogenation is carried out by stirring for 1 to 100 hours under a hydrogen pressure of 4 to 125 kg/cm² at a reaction temperature of 5° to 50° C. Without using hydrogen gas as a hydrogen source, the method described in JP-A-3-157346 may be performed. In this case, a primary or secondary alcohol is used in large excess as a hydrogen donor. After the completion of the reaction, the solvent is distilled off and the residue is distilled under reduced pressure. Thus, the target (S)-(+)-2-methylbutyric acid can be obtained.

As examples of the ruthenium-optically active phosphine complex usable herein, the following ones may be cited:

$$Ru_xH_yCl_z[(-)-(R-BINAP)]_2(S)_p \quad (1)$$

wherein (−)-(R-BINAP) stands for (−)-2,2'-bis(diphenylphosphino)-1,1'-binaphthyl or (−)-2,2'-bis(di-p-methylphenylphosphino)-1,1'-binaphthyl; S stands for a tertiary amine; and when y is 0, then x is 2, z is 4 and p is 1; and when y is 1, x is 1, z is 1 and p is 0;

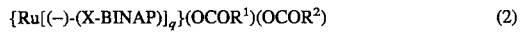

$$\{Ru[(-)-(X-BINAP)]_q\}(OCOR^1)(OCOR^2) \quad (2)$$

wherein (−)-(X-BINAP) stands for (−)-2,2'-bis(diphenylphosphino)-1,1'-binaphthyl optionally substituted by amino groups, acetylamino groups or sulfone groups at the 5- and 5'-positions of two naphthyl groups and by lower alkyl groups at the p-positions of four phenyl groups; $R^1$ and $R^2$ each stands for a lower alkyl group, a halogeno lower alkyl group or a phenyl optionally substituted by a lower alkyl group, α-aminoalkyl or α-aminophenylalkyl group, or $R^1$ and $R^2$ are combined with each other to thereby form an alkylene group; and q is 1 or 2; wherein the term "lower alkyl" means a straight or branched chain alkyl having 1 to 4 carbon atoms;

$$\{RuH_l[(-)-(R-BINAP)]_v\}Y_w \quad (3)$$

wherein (−)-(R-BINAP) has the same meaning as the one defined above; Y stands for $ClO_4$, $BF_4$ or $PF_6$; and when l is 0, then v is 1 and w is 2, and when l is 1, then v is 2 and w is 1; and

$$\{Ru[(-)-(BIPHEMP)]\}Y_2 \quad (4)$$

wherein (−)-(BIPHEMP) stands for (−)-2,2'-dimethyl-6,6'-bis(diphenylphosphino)-1,1'-biphenyl, (−)-2,2'-dimethyl-6,6'-bis(di-p-methylphenylphosphino)-1,1'-biphenyl or (−)-2,2'-dimethyl-6,6'-bis(di-p-methoxyphenylphosphino)-1,1'-biphenyl; and Y has the same meaning as the one defined above.

Each of the above-mentioned ruthenium-optically active phosphine complexes (1) to (3) can be obtained by the methods described in JP-A-63-239245 (corresponding to U.S. Pat. No. 4,962,230). On the other hand, the ruthenium-optically active phosphine complex (4) is a complex described in JP-A-63-145292 (corresponding to U.S. Pat. No. 4,764,629).

It is necessary in the present invention that at least one compound selected from a group consisting of (S)-(+)-2-methylbutyric acid and its esters has an optical purity of 70% e.e. or above.

The (S)-(+)-2-methylbutyric acid and its esters synthesized in accordance with the methods described in JP-A-63-239245 (U.S. Pat. No. 4,962,230) as cited above can be obtained each at a high optical purity of about 88% e.e. Then the optical purity level at which the effect of the (S)-enantiomer can be ensured is examined. As a result, it is found out that remarkable effects of the (S)-enantiomer are observed at an optical purity as high as about 70% e.e. in the present invention. Further, the preferable optical purity at which the effects of the (S)-enantiomer are clearly and surely achieved is examined. It is thus found out that the preferable optical activities of (S)-(+)-2-methylbutyric acid, (S)-(+)-methyl 2-methylbutyrate and (S)-(+)-ethyl 2-methylbutyrate are respectively 80% e.e. or above, 70% e.e. or above and 75% e.e. or above. Based on these results, it is estimated that the effects of the present invention can be established without fail in the case of other esters when the optical purity is 80% e.e. or above. Accordingly, it is proven that a compound having such an optical purity or above can surely achieve the effects of the present invention of improving the flavor and lifting up of the top note of a food or a drink, even though it is not purified but employed as such.

The expression "lifting up of the top note" as used herein means not only a phenomenon that the flavor of a food or a drink instantly spreads in the mouth but also a fact that one can feel the flavor of the drink or food when it is nearby the mouth.

To obtain a product of a high optical purity of 70% e.e. or above, the (S)-(+)-2-methylbutyric acid and its esters having a high optical purity, which have been synthesized by the above-mentioned chemical synthesis methods, may be optionally mixed with 2-methylbutyric acid and its esters which are in a state of racemic modifications and contained in natural substances, in particular, fruits.

Regarding these racemic modifications of 2-methylbutyric acid and its esters, it is known that 2-methylbutyric acid is contained in, for example, apricot, apple and strawberry, methyl 2-methylbutyrate is contained in, for example, apricot, apple, pear, strawberry and melon, ethyl 2-methylbutyrate is contained in, for example, melon, apple, strawberry, papaya, mango and kiwi fruit, propyl-2-methylbutyrate is contained in, for example, melon and apple, butyl 2-methylbutyrate is contained in, for example, apple and strawberry, 2-methylpropyl 2-methylbutyrate is contained in, for example, apricot, melon and papaya, pentyl 2-methylbutyrate is contained in, for example, apricot and apple, and 2-methylbutyl 2-methylbutyrate is contained in, for example, apricot, melon, pineapple and guava. In addition, it is known that 3-methylbutyl 2-methylbutyrate, hexyl 2-methylbutyrate, cis-3-hexenyl 2-methylbutyrate, heptyl 2-methylbutyrate, octyl 2-methylbutyrate, phenylmethyl 2-methylbutyrate, 2-phenylethyl 2-methylbutyrate and 3-phenyl-2-propyl 2-methylbutyrate are contained in various fruits.

In the present invention, the thus obtained (S)-(+)-2-methylbutyric acid and its esters having an optical purity of 70% e.e. or above can be added to various foods and drinks, either singly or in combination, to thereby improve the flavor and lifting up of the top note of the foods and drinks.

The amount of the (S)-(+)-2-methylbutyric acid and its esters to be added to various foods and drinks generally ranges from about 1 to 150 ppm based on the foods and drinks, though it may be optionally varied depending on the type of the foods and drinks. When the addition level is less than about 1 ppm, no clear effect of the addition can be achieved. When the addition level exceeds about 150 ppm, on the other hand, there is a risk that the flavor of the food or drink per se is deteriorated. When such a compound is to be added to a drink, it is particularly recommended to regulate the addition level thereof to about 1 to 100 ppm based on the drink.

It is also possible to blend one or more compounds selected from among (S)-(+)-2-methylbutyric acid and its esters having an optical purity of 70% e.e. or above with other components such as flavors to thereby give a flavor-improving agent which is to be added to foods and drinks. Such a flavor-improving agent may contain any components without restriction, so long as they are commonly used in food flavors.

The content of the (S)-(+)-2-methylbutyric acid and its esters in the flavor-improving agent preferably ranges from 1 to 15% by weight based on the flavor-improving agent, though it is not particularly restricted thereto.

When this flavor-improving agent is to be added to various foods and drinks, it is recommended to regulate the addition level of the (S)-(+)-2-methylbutyric acid and its esters within the range as specified above, i.e., from about 1 to 150 ppm based on the foods and drinks.

(S)-(+)-2-methylbutyric acid and its esters may be added to any foods and drinks without restriction, so long as the flavor-improving effects thereof are expected therein. Examples of the foods include confectionery such as caramels, candies, chocolates, chewing gums and baked products, frozen sweets such as ice creams and sherbets, puddings and jellies. Examples of the drinks include carbonated drinks such as soda pops, lemonade, various fruit soda pops, guarana and cola, various fruit juice drinks containing or being free from fruit juice, nectars, concentrated syrups to diluted at use, dairy drinks, luxury drinks, functional drinks and liquors.

According to the present invention, the qualities of the flavor, in particular, lifting up of the top note which has been regarded as being hardly improved, of a food or drink (for example, fruit juice, food) can be remarkably improved by adding at least one compound selected from a group consisting of (S)-(+)-2-methylbutyric acid and its esters having an optical purity of 70% e.e. or above thereto. Namely, the present invention provides a novel food or drink which is highly excellent in the flavor and lifting up of the top note, i.e., a green, fresh and light note, spreading lifting up of the top note over a wide range and an enhanced flavor formulation. Thus the commercial value of such a food or drink can be highly elevated.

Flavors of drinks containing (S)-(+)-2-methylbutyric acid and its esters (namely, the compounds of the present invention), (R)-(−)-2-methylbutyric acid and its esters (namely, the antipodes of the former compounds) and racemic modifications thereof (namely, conventional food flavors) were compared with each other in the following manner. As the ester samples, methyl esters and ethyl esters were selected.

(1) Selection of panelists

Skilled flavorists in their twenties or thirties (8 males and 2 females, i.e., 10 in total) were selected.

(2) Measurement of thresholds of compounds

A racemic modification was prepared by mixing an (S)-enantiomer with an (R)-enantiomer at a ratio of 1:1. Then the (S)-enantiomer, the (R)-enantiomer and the racemic modification were each diluted with water and the lowest concentration (threshold) at which the flavor thereof was detectable was measured by the triangle test. The triangle test comprises providing three samples including two which are the same as each other and one being different therefrom to panelists and making the panelists to guess which is the different one or which two are the same as each other. After repeating this procedure several times, it is judged whether these two types of samples are different from each other or not [see *Shinpan Kanno Kensa Handobukku* (*Sensory Test Handbook*, new ed.), ed. by Nikkagiren Kannou Kensa Iinkai, pp. 252–253 (1973)]. Based on these thresholds, the relative intensity of each compound was determined. When the thresholds of the compounds were the same, the relative intensities were evaluated based on the ratio of the correct answer.

Table 1 shows the results.

TABLE 1

| Compound | Threshold (ppb) | | | Relative Intensity |
|---|---|---|---|---|
| | (S) | Racemic (Ra.) | (R) | |
| 2-methylbutyric acid | 100 | 100 | 50 | S ≦ Ra. < R |
| methyl 2-methylbutyrate | 5 | 5 | 5 | S = Ra. ≧ R |
| ethyl 2-methylbutyrate | 10 | 10 | 10 | S = Ra. ≧ R |

(3) Preparation of flavor-improving agent for drinks by replacement

2-Methylbutyric acid and its esters in a state of racemic modifications in existing flavor formulations were replaced by the corresponding (S)- or (R)-enantiomers to thereby give flavor-improving agents for drinks.

When the relative intensities of the (S)-enantiomer, the (R)-enantiomer and the racemic modification determined in the above (2) were different from each other, the relative intensities were regulated to the same level by controlling the content of each compound. This is because a compound having a high relative intensity cannot always impart a good flavor and compounds differing in relative intensity from each other cannot be used as such in the comparison of flavors.

(4) Addition to drink

To a model drink was added each of the flavors prepared in the above (3) in a definite amount. Then flavors of the drinks containing the (S)-enantiomer, the (R)-enantiomer and the racemic modification were compared.

The results of the above procedures (3) and (4) are described in the following Examples and Comparative Examples.

In the following Examples and Comparative Examples, notes were expressed by reference to the expression given by M. Indo, *Koryo no Jissai Chishiki* (*Practical Knowledge on Perfumes*), Mar. 25, 1975, Toyo Keizai Shinpo K.K., page 3. In the formulations given in the following Examples and Comparative Examples, all contents are expressed in parts by weight.

REFERENTIAL EXAMPLE 1

Production of (S)-(+)-2-methylbutyric acid:

0.2 g (2 mmol) of tiglic acid and 20 ml of methanol were fed into a 100 ml stainless autoclave which had been subjected to the replacement with nitrogen. Next, 6.0 mg (0,007 mmol) of Ru[(−)-BINAP](BF$_4$)$_2$, wherein (−)-BINAP stands for (−)-2,2'-bis(diphenylphosphino)-1,1'-binaphthyl, was added thereto and hydrogenation was effected with stirring for 12 hours under a hydrogen pressure of 4 kg/cm$^2$ at a reaction temperature of 20° C. After distilling off the solvent, 0.2 g of the target (S)-(+)-2-methylbutyric acid was obtained (yield: 100%).

The optical rotation of the product was $[\alpha]_D^{25}= +16.7°$ (neat) and its purity determined by gas chromatography was 100%.

Then this product was reacted with (S)-1-phenylethylamine to thereby give an amide which was then analyzed by gas chromatography. As a result, it was found out that the optical purity of the (S)-(+)-2-methylbutyric acid was 88% e.e.

REFERENTIAL EXAMPLE 2

Production of (S)-(+)-methyl 2-methylbutyrate:

9 g (88 mmol) of the (S)-(+)-2-methylbutyric acid obtained by the method of the above Referential Example 1 was added to a solution prepared by dissolving 4.2 g (105 mmol) of sodium hydroxide in 24 ml of water and heated to 45° C. While maintaining the temperature of the solution at 45° to 50° C., 13.4 g (106 mmol) of dimethyl sulfate was dropped thereinto within 30 minutes. Then the mixture was reacted at the same temperature for 3 hours. After the completion of the reaction, the mixture was cooled to room temperature and 8.5 g (106 mmol) of a 50% aqueous solution of sodium hydroxide was dropped thereinto to thereby hydrolyze the excessive dimethyl sulfate. The oily layer was extracted with n-hexane and washed with a saturated aqueous solution of sodium chloride until it became neutral. Then the n-hexane was recovered by distilling under atmospheric pressure. Thus 7.2 g of (S)-(+)-methyl 2-methylbutyrate (boiling point: 115° C./760 mmHg) was obtained (yield: 70.6%).

The optical rotation of this product was $[\alpha]_D^{25}= +18.97°$ (neat) and its purity determined by gas chromatography was 100%.

REFERENTIAL EXAMPLE 3

Production of (S)-(+)-ethyl 2-methylbutyrate:

9 g (88 mmol) of the (S)-(+)-2-methylbutyric acid obtained by the method of the above Referential Example 1 was mixed with 20.24 g of 99.5% by vol. ethanol containing 0.4 g of conc. sulfuric acid and heated under reflux for 4 hours. After the completion of the reaction, the mixture was cooled to room temperature and poured into 150 ml of a saturated aqueous solution of sodium chloride. The oily layer was extracted with n-hexane and thus separated from the aqueous layer. Then it was further washed with a saturated aqueous solution of sodium chloride twice and dehydrated over calcium chloride. After distilling off the n-hexane under atmospheric pressure, the temperature was further elevated. Thus 9.3 g of (S)-(+)-ethyl 2-methylbutyrate (boiling point: 135° C./760 mmHg) was obtained (yield: 81.3%).

The optical rotation of this product was $[\alpha]_D^{25}= +15.61°$ (neat) and its purity determined by gas chromatography was 100%.

REFERENTIAL EXAMPLE 4

Production of (R)-(−)-2-methylbutyric acid:

The procedure of the above Referential Example 1 was repeated but using Ru[(+)-BINAP](BF$_4$)$_2$ as a substitute catalyst for Ru[(−)-BINAP](BF$_4$)$_2$. Thus (R)-(−)-2-methylbutyric acid was obtained.

The optical rotation of the product was $[\alpha]_D^{25}= −17.01°$ (neat) and its purity determined by gas chromatography was 100%.

Then this product was reacted with (S)-1-phenylethylamine to thereby give an amide which was then analyzed by gas chromatography. As a result, it was found out that the optical purity of the (S)-(+)-2-methylbutyric acid was 89% e.e.

REFERENTIAL EXAMPLE 5

Production of (R)-(−)-methyl 2-methylbutyrate:

The (R)-(−)-2 methylbutyric acid obtained in the above Referential Example 4 was esterified by the same method as the one described in Referential Example 2 to thereby give (R)-(−)-methyl 2-methylbutyrate.

The optical rotation of the product was $[\alpha]_D^{25}= −19.54°$ (neat) and its purity determined by gas chromatography was 99.3%.

REFERENTIAL EXAMPLE 6

Production of (R)-(−)-ethyl 2-methylbutyrate:

The (R)-(−)-2 methylbutyric acid obtained in the above Referential Example 4 was esterified by the same method as the one described in Referential Example 3 to thereby give (R)-(−)-ethyl 2-methylbutyrate.

The optical rotation of the product was $[\alpha]_D^{25}= −16.03°$ (neat) and its purity determined by gas.

EXAMPLE 1 AND COMPARATIVE EXAMPLES 1 AND 2

In accordance with the formulations of strawberry flavors as specified in Table 2, flavor-improving agents for drinks were prepared. The product containing the (S)-(+)-2-methylbutyric acid obtained in the above Referential Example 1 was referred to as Example 1, the one containing the (R)-(−)-2-methylbutyric acid obtained in the above Referential Example 4 was referred to as Comparative Example 1 and the one containing 2-methylbutyric acid in racemic modification was referred to as Comparative Example 2. The contents of these components were regulated so as to correct the differences among the relative intensities thereof as described above and the total amount of each sample was adjusted to 100 by adding ethyl alcohol (95%). 0.001% by weight of each flavor-improving agent for drinks thus obtained was added to a fruit juice-free, carbonated drink containing 10% by weight of glucose and 0.1% by weight of citric acid.

TABLE 2

| Formulation | Example 1 | Comp. Ex. 1 | Comp. Ex. 2 |
| --- | --- | --- | --- |
| (S)-(+)-2-methylbutyric acid | 2.000 | — | — |
| (R)-(−)-2-methylbutyric acid | — | 1.000 | — |
| 2-methylbutyric acid (racemic) | — | — | 2.000 |
| ethyl butyrate | 1.200 | 1.200 | 1.200 |
| isoamyl butyrate | 0.140 | 0.140 | 0.140 |
| butyric acid | 0.900 | 0.900 | 0.900 |
| ethyl lactate | 0.040 | 0.040 | 0.040 |
| benzyl alcohol | 2.000 | 2.000 | 2.000 |
| cis-3-hexenol | 1.000 | 1.000 | 1.000 |
| linalol | 0.100 | 0.100 | 0.100 |
| methyl ethyl phenylglycidate | 0.120 | 0.120 | 0.120 |
| hexanal | 0.080 | 0.080 | 0.080 |
| 3-ethoxy-2-methyl-4-pyrone | 1.500 | 1.500 | 1.500 |
| γ-decalactone | 0.170 | 0.170 | 0.170 |
| γ-undecalactone | 0.140 | 0.140 | 0.140 |
| ethyl alcohol (95%) | 55.610 | 56.610 | 55.610 |
| propylene glycol | 35.000 | 35.000 | 35.000 |
|  | 100.000 | 100.000 | 100.000 |

The flavor of each drink was evaluated by the above-mentioned 10 panelists. Table 3 shows the results.

TABLE 3

| Sample | Flavor | Evaluation of lifting up of top note* |
| --- | --- | --- |
| Drink containing flavor-improving agent of Example 1 having (S)-(+)-2-methylbutyric acid | Enhanced green and fresh note. | 10 |
| Drink containing flavor-improving agent of Comp. Ex. 1 having (R)-(−)-2-methylbutyric acid | Enriched matured note but jammy (just like cooked product lacking freshness) and sweet flavor. Unsuitable for drinks. | 0 |
| Drink containing flavor-improving agent of Comp. Ex. 2 having racemic modification | Remarkable sweet and matured note owing to the (R)-enantiomer. No freshness of the (S)-enantiomer detectable | 0 |

*: Evaluation of lifting up of top note is expressed in the number of panelists who regard the sample as being superior to other samples.

As Table 3 shows, the drink containing the flavor-improving agent of Example 1 having (S)-(+)-2-methylbutyric acid showed an enriched green and fresh note. In contrast, the drink containing the flavor-improving agent of Comparative Example 1 having (R)-(−)-2-methylbutyric acid showed an enriched mature note but lacked freshness. On the other hand, the one containing the flavor-improving agent of Comparative Example 2 having the racemic modification showed no fresh note owing to the addition of (S)-(+)-2-methylbutyric acid but a remarkable sweet and matured note owing to the addition of (R)-(−)-2-methylbutyric acid.

Thus it has been clarified that the drink containing the flavor-improving agent with the (S)-enantiomer has an enriched green and fresh note and, therefore is highly.

EXAMPLE 2 AND COMPARATIVE EXAMPLES 3 AND 4

In accordance with the formulations of strawberry flavors as specified in Table 4, flavor-improving agents for drinks were prepared. The product containing the (S)-(+)-methyl 2-methylbutyrate obtained in the above Referential Example 2 was referred to as Example 2, the one containing the (R)-(−)-methyl 2-methylbutyrate obtained in the above Referential Example 5 was referred to as Comparative Example 3 and the one containing methyl 2-methylbutyrate in racemic modification was referred to as Comparative Example 4.

TABLE 4

| Formulation | Example 2 | Comp. Ex. 3 | Comp. Ex. 4 |
| --- | --- | --- | --- |
| (S)-(+)-methyl 2-methylbutyrate | 1.000 | — | — |
| (R)-(−)-methyl 2-methylbutyrate | — | 1.000 | — |
| methyl 2-methylbutyrate (racemic) | — | — | 1.000 |
| ethyl butyrate | 1.500 | 1.500 | 1.500 |
| cis-3-hexenyl butyrate | 0.200 | 0.200 | 0.200 |
| ethyl acetate | 0.300 | 0.300 | 0.300 |
| benzyl acetate | 0.200 | 0.200 | 0.200 |
| ethyl hexanoate | 0.500 | 0.500 | 0.500 |
| ethyl lactate | 0.030 | 0.030 | 0.030 |
| cis-3-hexenol | 1.000 | 1.000 | 1.000 |
| linalol | 0.100 | 0.100 | 0.100 |
| methyl ethyl phenylglycidate | 0.100 | 0.100 | 0.100 |
| hexanal | 0.075 | 0.075 | 0.075 |
| 3-ethoxy-2-methyl-4-pyrone | 1.500 | 1.500 | 1.500 |
| γ-decalactone | 0.030 | 0.030 | 0.030 |
| ethyl alcohol (95%) | 58.195 | 58.195 | 58.195 |
| propylene glycol | 35.000 | 35.000 | 35.000 |
|  | 100.000 | 100.000 | 100.000 |

0.001% by weight of each flavor-improving agent for drinks thus obtained was added to a fruit juice-free, carbonated drink containing 10% by weight of glucose and 0.1% % by weight of citric acid. The flavor of each drink was evaluated by the above-mentioned 10 panelists. Table 5 shows the results.

TABLE 5

| Sample | Flavor | Evaluation of lifting up of top note* |
|---|---|---|
| Drink containing flavor-improving agent of Example 2 having (S)-(+)-methyl 2-methylbutyrate | Light note and spreading lifting up of fruity top note. | 10 |
| Drink containing flavor-improving agent of Comp. Ex. 3 having (R)-(–)-methyl 2-methylbutyrate | Heavy and oily note. | 0 |
| Drink containing flavor improving agent of Comp. Ex. 4 having racemic modification | Heavy and oily note. No characteristics owing to the addition of the (S)-methyl ester detectable. | 0 |

*: Evaluation of lifting up of top note is expressed in the number of panelists who regard the sample as being superior to other samples.

As Table 5 shows, the drink containing the flavor-improving agent of Example 2 having (S)-(+)-methyl 2-methylbutyrate showed a light note and spreading lifting up of the fruity top note. In contrast, the drink containing the flavor-improving agent of Comparative Example 3 having (R)-(–)-methyl 2-methylbutyrate showed a heavy and oily note. On the other hand, the one containing the flavor-improving agent of Comparative Example 4 having the racemic modification showed a heavy and oily note and lacked any characteristics owing to the addition of (S)-(+)-methyl 2-methylbutyrate.

Thus it has been clarified that the drink containing the flavor-improving agent with the (S)-enantiomer has a light note and spreading lifting up of the top note and, therefore, is highly superior to other products.

EXAMPLE 3 AND COMPARATIVE EXAMPLES 5 AND 6

In accordance with the formulations of muscat grape flavors as specified in Table 6, flavor-improving agents for drinks were prepared. The product containing the (S)-(+)-ethyl 2-methylbutyrate obtained in the above Referential Example 3 was referred to as Example 3, the one containing the (R)-(–)-ethyl 2-methylbutyrate obtained in the above Referential Example 6 was referred to as Comparative Example 5 and the one containing ethyl 2-methylbutyrate in racemic modification was referred to as Comparative Example 6.

TABLE 6

| Formulation | Example 3 | Comp. Ex. 5 | Comp. Ex. 6 |
|---|---|---|---|
| (S)-(+)-ethyl 2-methylbutyrate | 1.000 | — | — |
| (R)-(–)-ethyl 2-methylbutyrate | — | 1.000 | — |
| ethyl 2-methylbutyrate (racemic) | — | — | 1.000 |
| ethyl butyrate | 0.500 | 0.500 | 0.500 |
| butyric acid | 0.200 | 0.200 | 0.200 |
| phenylethyl butyrate | 1.500 | 1.500 | 1.500 |
| ethyl acetate | 2.000 | 2.000 | 2.000 |
| acetic acid | 0.250 | 0.250 | 0.250 |
| methyl anthranilate | 0.250 | 0.250 | 0.250 |
| cis-3-hexenol | 2.000 | 2.000 | 2.000 |
| linalol | 0.050 | 0.050 | 0.050 |
| cinnamic alcohol | 0.350 | 0.350 | 0.350 |
| phenethyl alcohol | 0.500 | 0.500 | 0.500 |
| 3-ethoxy-2-methyl-4-pyrone | 5.000 | 5.000 | 5.000 |
| fusel oil | 0.200 | 0.200 | 0.200 |
| ethyl alcohol (95%) | 51.200 | 51.200 | 51.200 |
| propylene glycol | 35.000 | 35.000 | 35.000 |
| | 100.000 | 100.000 | 100.000 |

0.001% by weight of each flavor-improving agent for drinks thus obtained was added to a fruit juice-free, carbonated drink containing 10% by weight of glucose and 0.1% by weight of citric acid. The flavor of each drink was evaluated by the above-mentioned 10 panelists. Table 7 shows the results.

TABLE 7

| Sample | Flavor | Evaluation of lifting up of top note* |
| --- | --- | --- |
| Drink containing flavor-improving agent of Example 3 having (S)-(+)-ethyl 2-methylbutyrate | Enriched muscat grape note and spreading lifting up of the top note. | 10 |
| Drink containing flavor-improving agent of Comp. Ex. 5 having (R)-(−)-ethyl 2-methylbutyrate | Heavy and oily note with a little medical smell. | 0 |
| Drink containing flavor-improving agent of Comp. Ex. 6 having racemic modification | Heavy and oily note. No characteristics owing to the addition of the (S)-ethyl ester detectable. | 0 |

*: Evaluation of lifting up of top note is expressed in the number of panelists who regard the sample as being superior to other samples.

As Table 7 shows, the drink containing the flavor-improving agent of Example 3 having (S)-(+)-ethyl 2-methylbutyrate showed an enriched note of muscat grape and spreading lifting up of the top note. In contrast, the drink containing the flavor-improving agent of Comparative Example 5 having (R)-(−)-ethyl 2-methylbutyrate showed a heavy and oily note. On the other hand, the one containing the flavor-improving agent of Comparative Example 6 having the racemic modification showed a heavy and oily note and lacked any characteristics owing to the addition of (S)-(+)-ethyl 2-methylbutyrate.

Thus it has been clarified that the drink containing the flavor-improving agent with the (S)-enantiomer has an enriched note of muscat grape and spreading lifting up of the top note and, therefore, is highly superior to other products.

EXAMPLE 4

The (S)-(+)-2-methylbutyric acid and its esters synthesized in accordance with the methods described in JP-A-63-239245 (corresponding to U.S. Pat. No. 4,962,230) could be obtained each in a high optical purity of about 88% e.e. Then the optical purity level at which the effect of the (S)-compound could be ensured was examined.

By mixing the (R)-enantiomers at arbitrary ratios, (S)-(+)-2-methylbutyric acid and its esters at arbitrary optical purities were prepared. Then the optical purity at which the effect of the (S)-enantiomer could be clearly distinguished was determined by the application of the dual-standard test. The dual-standard test comprises first providing samples A and B to panelists as identified samples to thereby allow the panelists to remember the characteristics of each samples, then providing the samples A and B to the panelists as blind samples and making them point out the sample differing from A. After repeating this procedure several times, it is judged whether these samples differ from each other or not on the basis of the ratio of the correct answer [see Shin Sato, *Kanno Kensa Nyumon* (*Guidance for Sensory Tests*), page 54, Oct. 16, 1978, K.K. Nikkagiren Shuppan].

Table 8 shows the results.

TABLE 8

| Compound | Minimum optical purity for distinguishing (S)-enantiomer (% e.e.) |
| --- | --- |
| (S)-(+)-2-methylbutyric acid | 80 |
| (S)-(+)-methyl 2-methylbutyrate | 70 |
| (S)-(+)-ethyl 2-methylbutyrate | 75 |

As Table 8 shows, in the present invention, (S)-(+)-2-methylbutyric acid having an optical purity of 80% e.e. or above, (S)-(+)-methyl 2-methylbutyrate having an optical purity of 70% e.e. or above and (S)-(+)-ethyl 2-methylbutyrate having an optical purity of 75% e.e. or above can surely achieve the effects of improving the flavor of a food or a drink, even though they are not purified but employed as such. Based on these results, it is also found that other esters can surely achieve the effects of the present invention so long as they have an optical purity of 80% e.e. or above.

While the invention has been described in detail and with reference to specific embodiments thereof, it will be apparent to one skilled in the art that various changes and modifications can be made therein without departing from the spirit and scope thereof.

What is claimed is:

1. A method for improving the flavor of a drink by lifting up the top note of said drink which comprises adding at least one compound selected from the group consisting of (S)-(+)-2-methylbutyric acid esters having an optical purity of 70% e.e. or above at a ratio of from 1 to 150 ppm, in terms of optical purity of 100%, based on the drink.

2. A method for improving the flavor of a drink as in claim 1, wherein (S)-(+)-methyl 2-methylbutyrate having an optical purity of 70% e.e. or above is added.

3. A method for improving the flavor of a drink as in claim 1, wherein (S)-(+)-methyl 2-methylbutyrate having an optical purity of 75% e.e. or above is added.

* * * * *